Dec. 7, 1926.
F. MOHN
REEL
Filed May 2, 1923
1,609,490
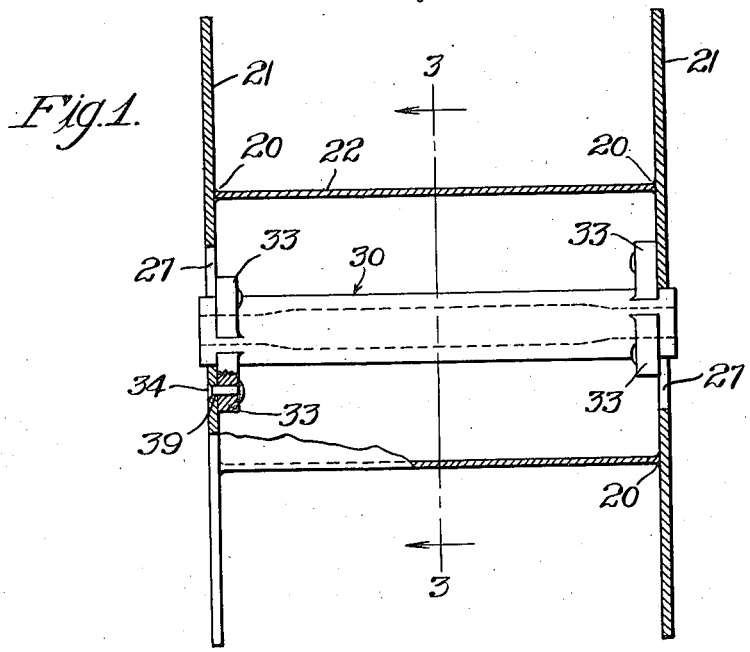
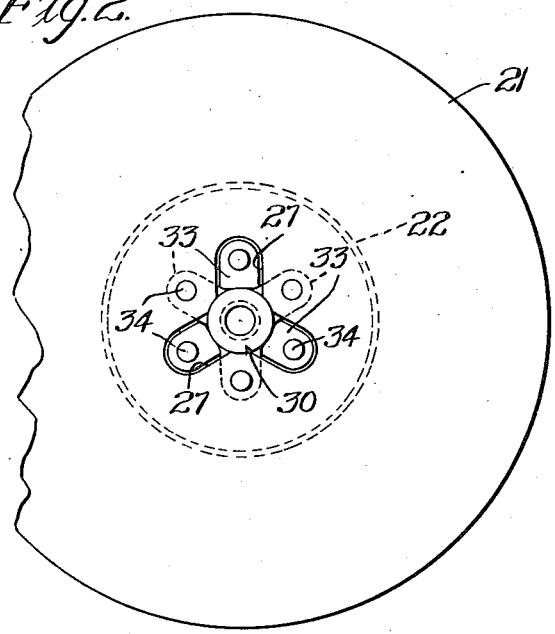
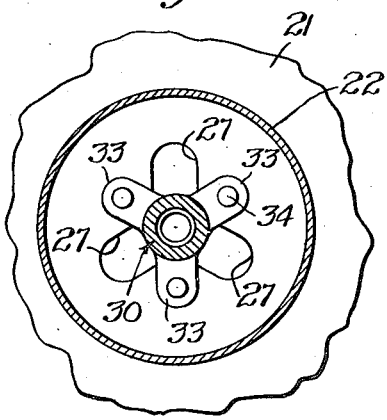
Inventor
Finn Mohn
by H. A. Pattison
Atty.

Patented Dec. 7, 1926.

1,609,490

UNITED STATES PATENT OFFICE.

FINN MOHN, OF CHICAGO, ILLINOIS, ASSIGNOR TO WESTERN ELECTRIC COMPANY, INCORPORATED, OF NEW YORK, N. Y., A CORPORATION OF NEW YORK.

REEL.

Application filed May 2, 1923. Serial No. 636,084.

This invention relates to reels and more particularly to a reel having an improved form of hub.

At present it is customary to make the reel and hub either as one unit, or where it is possible to replace the hub, to make, in one case, the heads separable from the drum, or in the other, to make the hub in a plurality of parts so that part can be removed from either side of the reel.

Where the reel and the hub are one unit it is necessary, upon the reel becoming unserviceable through an injury of either the reel itself or the hub, to replace the whole unit. Where the hub is held in place by the heads and removable by removing the heads from the drum, where the hub is made in a plurality of parts, the members are somewhat weakened by making them separable, and more costly processes are required in their manufacture.

An object of this invention is to provide a reel with a hub which can be removed without disassembling either the reel or the hub.

Another object is to provide a hub for use with reels which can be replaced as a unit without disassembling the reel.

Another object is to promote the facility of mounting and dismounting such a member.

Another object is to provide a hub for a reel, which, when in position within the reel, will leave the outer surfaces of the heads thereof flush.

In general the invention consists in associating with a reel of any type a hub having a lug integral therewith, the hub and lug being capable of insertion through an opening provided for this purpose in the reel, and which, after insertion, can be connected firmly to said reel by means of said lug. This provides a mounting member which is strong, durable, simple of construction, and easy to replace.

Projections on the outer surfaces of the heads are undesirable as they tend to catch on associated apparatus when the reel is in operation. The device disclosed herein is constructed in a manner which leaves the heads free of any such projections. This is accomplished by making all connections on the inner surfaces of the heads by means which leave the outer surface thereof flush, for instance, countersunk head rivets.

In the accompanying drawings,

Fig. 1 shows a side elevation of a reel partly in section to more clearly show the hub in position;

Fig. 2 is an end view of a reel with the hub in place, and

Fig. 3 shows a section on the line 3—3 of Fig. 1 and illustrates one manner of connecting the hub to the head.

Referring to the drawings in detail, a core or drum 22 upon which cable or strand is wound, and which may be of sheet metal, is welded to two heads 21 at points 20.

A hub, shown generally as 30, which may be constructed of iron, carries a plurality of lugs 33 at opposite ends of the hub which are offset from each other, the reason for which will be given later. These lugs are here shown cast integral with the hub, though any rigid mounting thereof will be suitable.

Openings 27 are provided in the heads 21 of the reel, which are in shape similar to, but in size slightly larger than, an end elevation of the hub with one set of lugs. These openings are to permit the insertion of the hub with its lugs. The lugs are fastened to the heads 21 of the reel by means of rivets 34, through holes 39. The openings 27 in opposite heads are offset through the same angle as the lugs. This brings the openings in one end opposite the lugs in the other when the hub is in position within the reel, and is for the purpose of allowing the convenient insertion of a tool from the opposite end while the hub is being affixed in place by rivets or other suitable means.

In removing a hub the rivets 34 are first removed; the hub 30 is then turned to make the lugs 33 register with the openings 27, drawn endwise sufficiently to allow the lugs 33 to clear the head 21, revolved through the offset angle of the other set of lugs, which causes these lugs to register with the openings, and then drawn completely out.

In mounting a hub the lugs on one end are made to register with the opening in one end of the reel and inserted far enough to let the lugs clear the head on the inside, turned through the offset angle to make the other set of lugs register with the opening and moved all the way in. The hub is then turned so that the lugs do not register with the openings and is connected to the heads by suitable means, for instance rivets.

What is claimed is:

1. A reel having a hub, a lug thereon, a drum, a head having an opening therein to permit the insertion of said hub and lug.

2. A reel having a hub, a lug thereon, a drum, a head having an opening therein to permit the insertion of said hub and lug and means for connecting the lug to the reel head.

3. A reel having a hub, a plurality of lugs thereon, a drum, heads connected to said drum and having openings therein to permit the insertion of said hub and lugs.

4. A reel having a hub, lugs thereon at either end, those at one end being offset from those at the other, a drum, heads connected thereto with openings therein to permit the insertion of the hub and lugs.

5. A reel having a hub, a lug thereon at either end, said lugs being offset from each other, a drum, heads having openings therein to permit the insertion of the hub and lugs and means for connecting the lugs to said heads.

6. A reel having a hub, a lug thereon at either end, said lugs being offset from each other, a drum, heads having openings therein to permit the insertion of the hub and lugs and means for connecting the lugs to the inner faces of the heads.

7. A reel having a hub, a plurality of lugs at either end, those at one end being offset from those at the other, a drum, heads provided with openings to permit the insertion of said hub and lugs, the openings at opposite ends being offset through the same angle as the lugs and means for connecting the lugs to the reel heads.

8. A reel having a hub, a plurality of lugs at either end, those at one end being offset from those at the other, a drum, heads connected to said drum with radiate openings therein to permit the insertion of said hub and lugs, the openings at opposite ends being offset through the same angle as the lugs.

In witness whereof, I hereunto subscribe my name this 24th day of April A. D., 1923.

FINN MOHN.